United States Patent [19]

Reynolds

[11] Patent Number: 4,696,376

[45] Date of Patent: Sep. 29, 1987

[54] CONFIGURATION FOR A DISK BRAKE TORQUE TUBE

[75] Inventor: Daniel S. Reynolds, Canal Fulton, Ohio

[73] Assignee: Loral Corporation, New York, N.Y.

[21] Appl. No.: 859,282

[22] Filed: Apr. 30, 1986

[51] Int. Cl.$^4$ .............................................. F16D 55/36
[52] U.S. Cl. ................................ 188/71.5; 188/18 A; 192/70.2
[58] Field of Search ................. 188/71.1, 71.5, 18 A; 192/70.2

[56] References Cited

U.S. PATENT DOCUMENTS 1,803,077  4/1931  Spase .............................. 192/70.2 X
4,383,594  5/1983  Correll et al. ................. 188/71.1 X

FOREIGN PATENT DOCUMENTS 1130707  5/1962  Fed. Rep. of Germany ..... 188/71.5
2031540  4/1980  United Kingdom ............... 188/71.5
 199680  8/1965  U.S.S.R. ............................. 188/71.5

*Primary Examiner*—George E. A. Halvosa
*Attorney, Agent, or Firm*—L. A. Germain; P. E. Milliken

[57] ABSTRACT

A torque tube (50) having a cylindrical body (50a) is characterized by a plurality of key surfaces (50k) which extend radially from the surface (50s) and extend longitudinally from an inboard end (50i) to terminate at an outboard end (50o) in a radius (R3) which defines a transition (50t) into a radially extending rib (50r). The cylindrical body portion between adjacent keys (50k) also extends at the outboard end (50o) into a flange (50f) which is continuous about the outboard end of the tube. The combination of radially extending ribs (50r) and flange (50f) define T-sections at the outboard end (50o) which provide the strength requirements of the torque tube in its intended service application.

4 Claims, 3 Drawing Figures

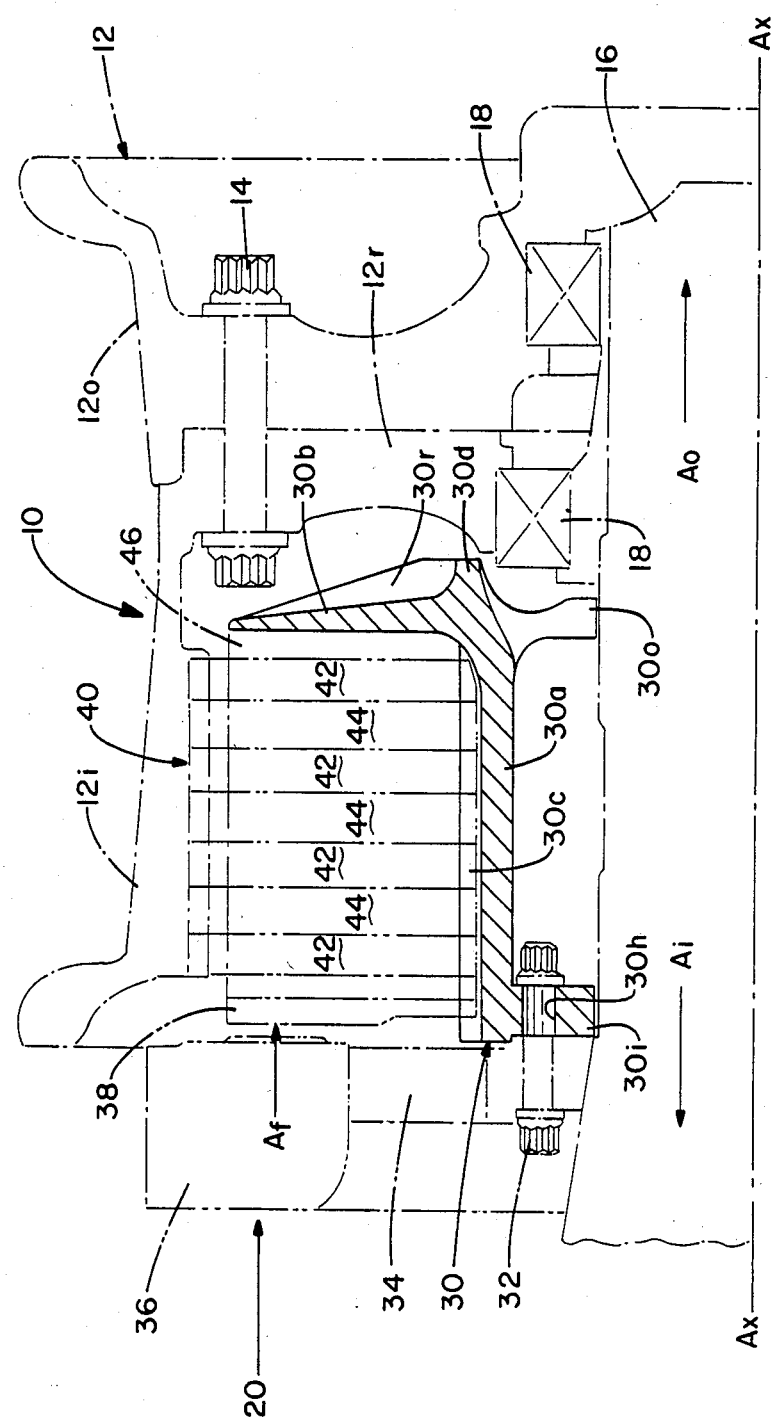
FIG.—1
Prior Art

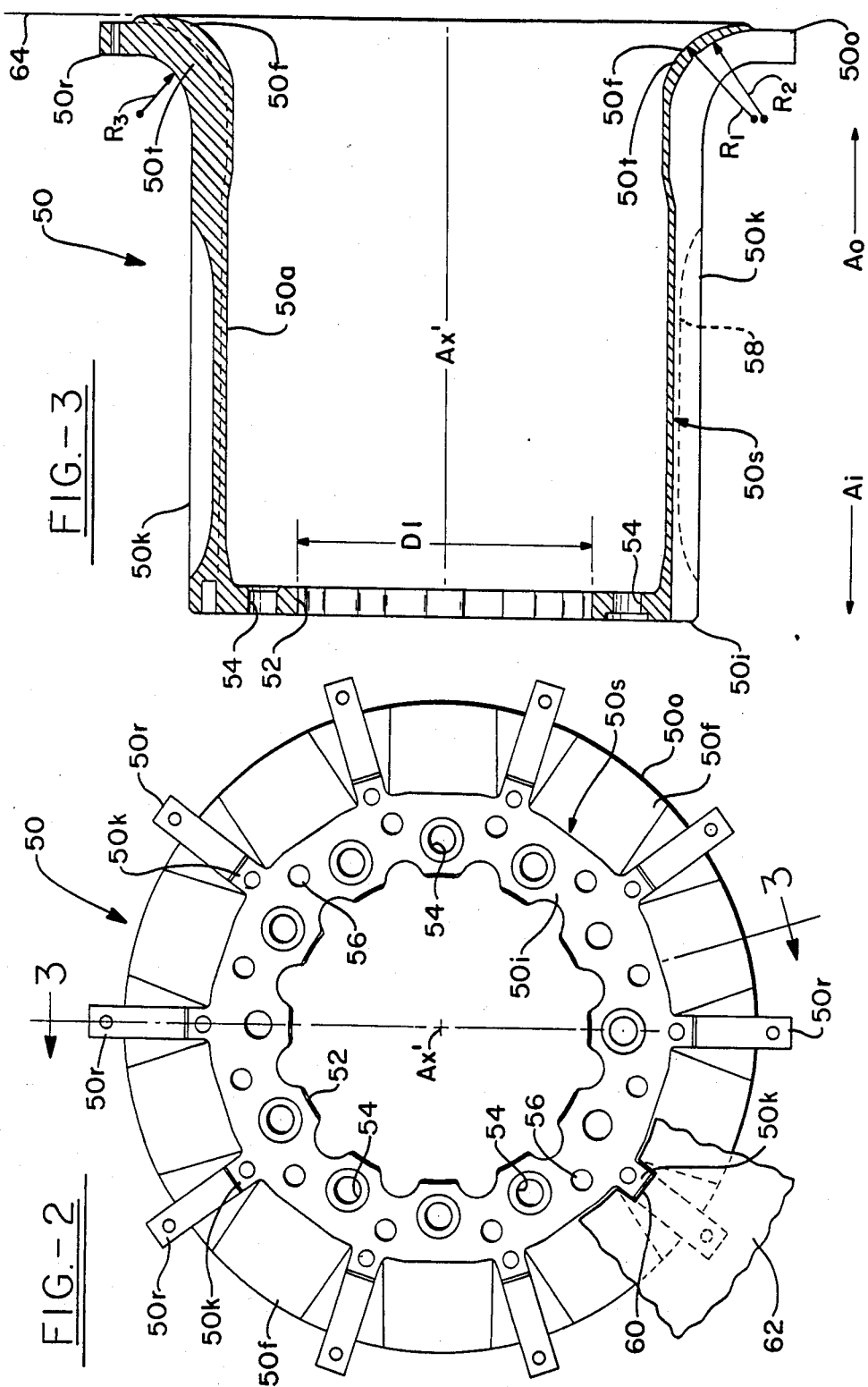

CONFIGURATION FOR A DISK BRAKE TORQUE TUBE

This invention generally pertains to disk brakes and more particularly to a unique configuration for a torque tube which is an integral element in a multi-disk brake assembly.

More specifically, the invention provides a torque tube that is lighter in weight and less costly to produce than presently used torque tubes for the same service while exhibiting an improved stiffness and lower stresses in the structure. Further, the torque tube of this invention also saves space in the critically close volume area within an aircraft wheel cavity.

SUMMARY OF THE INVENTION

A torque tube is adapted for stationary mounting to a brake housing and is coaxial about a wheel axle and provides keyed engagement with alternate ones of a disk brake stack and comprises: a substantially cylindrical body portion having an open outboard end and substantially closed inboard end, the inboard end having an axial bore of sufficient diameter to receive the wheel axle therethrough and a plurality of radially located axial holes each of which receives a bolt to effect mounting of the torque tube to the brake housing, the cylindrical body portion having an outward facing peripheral surface characterized by a plurality of spaced-apart key surfaces for engagement with the alternate ones of the disk stack, each key surface extending radially from the surface of the cylindrical body portion and also longitudinally from the inboard end to the outboard end and terminating at the outboard end in a radius which forms a transition into a radially extending rib, said cylindrical body portion between adjacent key surfaces extending into a radius at the outboard end which meets a radially extending flange portion, the flange portions being continuous about the outboard end of the torque tube.

BRIEF DESCRIPTION OF THE DRAWINGS

Various features and advantages of the invention will be better understood and appreciated from a consideration of the following detailed description of the preferred embodiment when taken in conjunction with the accompanying drawings in the several figures in which like parts bear like reference numerals and in which:

FIG. 1 is a sectional elevational view of the upper portion of a conventional prior art aircraft wheel and brake assembly having an axis of rotation about Ax—Ax, the portions which are pertinent to this invention being shown in solid lines while the remaining portions which illustrate the environment of the invention are shown in dot-dashed ghost lines;

FIGS. 2 is an elevational end view of the torque tube which comprises this invention, the view being taken from the inboard end toward the outboard end to the tube as it may be applied to an aircraft wheel and brake assembly and with reference to the indicated arrows Ai and Ao respectively; and FIGS. 3 is an elevational view, in cross-section, of the torque tube as may be taken on line 3—3 of FIG. 2.

DETAILED DESCRIPTION OF THE INVENTION

By way of example, reference is first made to FIG. 1 of the drawings wherein a prior art aircraft wheel and brake assembly is illustrated and generally indicated by reference numeral 10. Generally, the assembly 10 includes a two-part wheel 12 comprised of an inboard wheel half 12$i$ and an outboard wheel half 12$o$. The inboard and outboard directions of the assembly 10 are indicated by arrows Ai and Ao respectively.

The two wheel halves 12$i$ and 12$o$ are fastened together by a plurality of wheel bolts 14 and the complete wheel is mounted for rotation about an axle 16 including a plurality of wheel bearings 18 in the conventional manner. The axis of rotation of the rotatable elements of the assembly 10 is about the line indicated by Ax—Ax. A brake assembly generally indicated by reference numeral 20 is mounted at the inboard side of the wheel 12 and within a cavity formed by the rib 12$r$ of the inboard wheel half 12$i$. The brake assembly 20 includes a torque tube 30 mounted via plurality of bolts 32 to the brake housing 34 which has a plurality of brake actuators 36 mounted therein. The brake actuators 36, when operative for braking action, apply a brake pressure force in the direction of Arrow Af to a brake pressure plate 38 which transmits the braking pressure force to a brake disk stack generally indicated at 40.

Wheel braking action is accomplished by the brake disk stack 40 which is comprised of alternating brake disks 42 and friction disks 44 either of which may be keyed for rotation with the wheel 12 or alternatively keyed to be relatively stationary with the torque tube 30. As illustrated in the drawing, the outer periphery of the rotating members of the brake disk stack 40 are keyed to the inner periphery of the inboard wheel half 12$i$ while the inner periphery of the stationary members of the brake stack 40 are keyed to the outer periphery of the torque tube 30. The torque tube 30 therefore, plays a primary role in the braking action of the wheel and the design and construction of it is a critical matter in the effectiveness of the brake system.

Conventionally, the torque tube 30 is a cylindrical member having a body portion 30$a$ which interconnects an inboard end 30$i$ to an outboard end 30$o$. The inboard end is characterized by a plurality of bolt mounting holes 30$h$ while the outboard end is characterized by a radially extending backplate 30$b$. The backplate 30$b$ functions to engage the brake disk stack 40 through an end plate 46 and the brake disk stack is thus clamped between it and the pressure plate 38 at the inboard end as the pressure force is applied for braking action. The torque tube 30 is further characterized by a plurality of keyways or keying interconnections indicated at 30$c$ which are about the periphery of the body portion 30$a$. These keyways cooperate with alternate ones of the brake disk stack 40 such as to maintain a relative stationary position of the alternate ones of the brake disks with respect to the rotating disks of the stack.

The torque tube 30 is also conventionally a one-piece forged or cast steel member which is machined to close tolerance to thus provide the keying interconnections with the specific disks of the brake disk stack. It may be appreciated by a consideration of the torque tube 30 shown in FIG. 1 that at least two machining operations are required to (a) establish the keyways 30$c$ for the brake disk interconnection and (b) establish the proper angular relationship of the radially extending backplate portion 30$b$. It may be further appreciated that, because of the high pressure forces which are exerted by the plurality of actuators 36 on the brake disk stack in the outboardly direction through the pressure plate 38, the backplate 30$b$ must be strong enough to accept this force and thus effect clamping action of the brake disk stack 40. Accordingly, such torque tubes 30 have evolved with various configurations of backup ribs as indicated at 30r and these are for the purpose of adding strength to the backplate 30b. Of course, there is a limit to the outboard extent of the backup ribs 30r due to the axial spacial limitation within the cavity formed by the inboard wheel half 12i. For example the wheel 12 rotates while the torque tube 30 is stationary and therefore adequate clearances must be provided for the wheel rib 12r and the wheel bolts 14.

Referring now to FIGS. 2 and 3 of the drawings, a torque tube in accordance with this invention is illustrated and generally indicated by reference numeral 50. The torque tube 50 has a generally cylindrical body portion 50a which interconnects a substantially closed inboard end 50i to an open outboard end 50o. The inboard end 50i has an axial bore 52 of a diameter D1 sufficient for receiving a wheel axle (not shown) therethrough in a substantially coaxial relationship about the torque tube axis indicated at Ax'. The inboard end 50i is further characterized by a plurality of radially positioned axial bores or holes 54 which are adapted for receiving mounting bolts therein so as to affix the torque tube 50 to a brake housing member in a similar manner as the torque tube 30 of FIG. 1 is affixed to the brake housing 34 via mounting bolts 32. In addition, a plurality of evenly spaced-apart radially oriented bores or holes 56 may be provided through the inboard end 50i and these to reduce the overall weight of the torque tube 50.

The body portion 50a has an outward facing peripheral surface indicated generally at 50s which is characterized by a plurality of spaced-apart radially extending keys 50k. Each key 50k extends longitudinally for the substantial lengthwise extent of the body portion 50a and, in the operation of the torque tube 50, serves to engage a keyway slot 60 which is formed in an inner peripheral surface of a brake disk as shown by the small portion of a disk 62 in FIG. 2. The keys 50k are machined surfaces at substantially equally spaced angular intervals about the body portion 50a and so as to further reduce the overall weight of the torque tube 50, slots 58 may be machined into each such key 50k for a substantial portion of its lengthwise extent.

Finally, the outboard end 50o of the torque tube 50 is characterized by an annular, radially extending flange 50f that forms a smooth continuous surface about the open end of the cylindrical body portion 50a. The flange 50f is formed at its outboard extent by a curve having a radius R1 and at its inboard extent by a curve having a radius R2. Further, each key 50k is extended in the outboard direction into a radially extending rib 50r. A key 50k and a rib 50r are interconnected through a curved transition 50t having a radius R3. The radii R1, R2, and R3 may or may not have their centers of radius coincident but as obviously seen in FIG. 3 of the drawings, all centers of radius are located at an inboard position with respect to a line 64 that is perpendicular to the torque tube axis Ax' and which defines the outboard extent of the torque tube 50.

It will be appreciated by those skilled in this art that the torque tube of this invention offers substantial advantages over the prior art torque tube of the type 30 indicated in FIG. 1. Firstly, the sites of the keys 30c and the inboard face of the backplate 30b must be machined in separate operations due to the character of the transition as between a key 30c and the backplate 30b. Each key 30c is intermittent at its outboard extent while the inner radius as between the face of the backplate 30b and the surface of the barrel portion 30a is continuous. In contrast the torque tube 50 has keys 50k, a flat area along the barrel 50a, and a radius R2 which may all be machined in a single continuous operation.

Secondly, the structural advantage of the torque tube 50 is due to the continuous transition as between each key 50k and the backup rib 50r. In other words, each key 50k is continuous into a backup rib 50r from the barrel portion 50a. Furthermore, it can be seen that a T-section exists by reason of each key 50k providing the base of the T-section while the flange 50f provides the top of the T-section. A T-section therefore exists at the site of each key 50k. In contrast, the torque tube, of the type 30 shown in FIG. 1, requires a heavy ring stiffner indicated at 30d in order to maintain strength and stiffness at the transition between the barrel portion 30a and the backplate 30b. Obviously, such ring stiffner 30d is not a requirement of the present invention.

While a single embodiment of the invention has been illustrated and described in detail, it is to be understood that the invention is not considered limited thereto or thereby, but that various modifications may become apparent to those persons skilled in the art and these are considered to fall within the scope of the appended claims.

What is claimed is:

1. In a wheel and brake assembly having an inboard end and an outboard end as determined by a brake housing at the inboard end, the brake assembly including a plurality of disk elements comprising a brake disk stack wherein various ones of the stack are keyed for rotation with the wheel while various alternate ones are keyed to be relatively stationary to effect braking of the wheel when the disk stack is compressed in the axial direction of the assembly, said wheel being mounted for rotation about an outboard end of a wheel axle having an inboard end affixed to the brake housing;

a torque tube adapted for stationary mounting to the brake housing and coaxial about the wheel axle and in keyed engagement with the alternate ones of the brake disk stack and comprising:

a substantially cylindrical body having an open outboard end and a substantially closed inboard end, the inboard end having an axial bore of sufficient diameter for receiving the wheel axle therethrough and having a plurality of radially located axial holes each of which receives a bolt to effect mounting of the torque tube to the brake housing, the cylindrical body having an outward-facing peripheral surface characterized by a plurality of key surfaces for engagement with the alternate ones of the brake disk stack and each said key surface extends longitudinally from the inboard end to the outboard end and terminates at the outboard end in a transition radius which meets a rib extending radially therefrom and the cylindrical body between adjacent key surfaces extends into a radially extending flange which is at least in part outboard of said key surfaces and which is annularly continuous about the outboard end of the body and each said radially extending rib and radially extending flange of the cylindrical body between adjacent ribs define a T-section at the outboard extent of each said key.

2. The torque tube as set forth in claim 1 wherein the transition radius between each key and radial rib has a center located inboardly of the outboard extent of the cylindrical body.

3. The torque tube as set forth in claim 2 wherein the radially extending flange is connected to the cylindrical body through a radius having its center located inboardly of the outboard extent of the cylindrical body and the length of radius is greater than the transition radius between each key and radial rib.

4. The torque tube as set forth in claim 3 wherein the radial extent of each rib is greater than the radial extent of the flange as measured from the surface of a key.

* * * * *